United States Patent
Wang et al.

(10) Patent No.: US 11,663,364 B2
(45) Date of Patent: May 30, 2023

(54) WHOLE-LIFECYCLE ENCRYPTED BIG DATA ANALYSIS METHOD AND SYSTEM FOR THE DATA FROM THE DIFFERENT SOURCES

(71) Applicant: Hangzhou Nuowei Information Technology Co., Ltd., Hangzhou (CN)

(72) Inventors: Shuang Wang, Hangzhou (CN); Zhi Li, Hangzhou (CN); Hao Zheng, Hangzhou (CN)

(73) Assignee: Hangzhou Nuowei Information Technology Co., Ltd., Hangzhou (CN)

( * ) Notice: Subject to any disclaimer, the term of this patent is extended or adjusted under 35 U.S.C. 154(b) by 17 days.

(21) Appl. No.: 17/115,593

(22) Filed: Dec. 8, 2020

(65) Prior Publication Data

US 2021/0117395 A1 Apr. 22, 2021

(30) Foreign Application Priority Data

Oct. 8, 2019 (CN) .......................... 201910948927.0

(51) Int. Cl.
| | |
|---|---|
| *G06F 16/215* | (2019.01) |
| *G06F 21/53* | (2013.01) |
| *G06K 9/62* | (2022.01) |
| *G06F 16/23* | (2019.01) |
| *G06F 21/60* | (2013.01) |
| *G06F 21/74* | (2013.01) |
| *G06F 18/21* | (2023.01) |
| *G06F 18/214* | (2023.01) |

(52) U.S. Cl.
CPC ............ *G06F 21/74* (2013.01); *G06F 16/215* (2019.01); *G06F 16/2358* (2019.01); *G06F 18/217* (2023.01); *G06F 18/2148* (2023.01); *G06F 21/53* (2013.01); *G06F 21/602* (2013.01)

(58) Field of Classification Search
CPC .... G06F 16/215; G06F 16/2358; G06F 21/53; G06F 21/602; G06F 21/74; G06F 21/6227; G06K 9/6257; G06K 9/6262; H04L 9/0897; H04L 9/3239; H04L 9/50; H04L 67/10; G06N 20/00
See application file for complete search history.

(56) References Cited

PUBLICATIONS

Yang, Applied Federated Learning: Improving Google Keyboard Query Suggestions, pp. 1-9 Dec (Year: 2018).*

(Continued)

*Primary Examiner* — Albert M Phillips, III

(57) ABSTRACT

This is a whole-lifecycle encrypted big data analysis method and system for the data from the different sources. The method performs unified local modeling of data from multiple data sources and transmitting them to a secure computing server after encryption. This secure computing server then processes and analyzes the data, including feature extraction, model training and model validation. The system includes multiple data sources corresponding to the described method and a secure computing server, for providing data, analyzing and processing the data. By processing and encrypting the data locally, and by supporting secure data sharing and federated learning of multiple data sources, this invention achieves protection of the data sources and addresses the privacy and security issues of the raw data for cross-institution big data collaborative analysis.

20 Claims, 3 Drawing Sheets

(56) References Cited

PUBLICATIONS

McMahan, Google AI Blog: Federated Learning: Collaborative Machine Learning without Centralized Training Data, pp. 1-7, (Year: 2018).*

Hardy, Private federated learning on vertically partitioned data via entity resolution and additively homomorphic encryption, pp. 1-60 (Year: 2017).*

Kaur, Data deduplication techniques for efficient cloud storage management: a systematic review, pp. 2035-2085 (Year: 2018).*

Moataz, Resizable Tree-Based Oblivious RAM, pp. 1-19 (Year: 2015).*

Nilsson, A Performance Evaluation of Federated Learning Algorithm, pp. 1-8, (Year: 2018).*

Sattler, Robust and Communication-Efficient Federated Learning from Non-IID Data, pp. 1-7, March (Year: 2019).*

* cited by examiner

WHOLE-LIFECYCLE ENCRYPTED BIG DATA ANALYSIS METHOD AND SYSTEM FOR THE DATA FROM THE DIFFERENT SOURCES

FIELD OF INVENTION

This invention relates to the fields of Big Data Analysis, Federated Learning, and Privacy-Preserving, in particular to a whole-lifecycle encrypted big data analysis method and system for the data from the different sources.

BACKGROUND

Data analysis technologies keep developing each passing day, and the resulting problems are also very significant. For example, big data analysis of multi-party may lead to leakage of sensitive information among them. Secure sharing of multi-center big data and personal information protection are crucial in the development of big data technology. In response to these issues, recently, various countries and regions around the world have enacted legislation on the privacy of user data, especially medical data. For example, China officially implemented the "Network Security Law of the People's Republic of China" on Jun. 1, 2017. Another example is the EU promulgated and implemented the General Data Protection Regulation on May 25, 2018.

The current big data secure sharing analysis service is still in the immature stage, lacking the protection of commercial secrets and the raw data. It is difficult to realize the protection of sensitive information in the calculation and analysis process. Also, there are no systematic standards and protection measures formed. Strict laws and lack of protection systems and standards have seriously affected the rapid progress and development of various disciplines under the trend of big data popularization.

China patents a big-data trading secret protection system and method, application number 201811038638.9. The invention can encrypt some private data of users, thereby preventing related enterprises and organizations from collecting and using the private data of users. The invention does not involve the secure sharing of data from multiple institutions and federated learning; does not support various big data analysis methods, and only involves data encryption storage and reading.

China patents a cloud computing big-data trading secret protection method, application number 201710666085.0. The invention realizes the protection of data privacy by setting up multiple authentication servers in the cloud storage platform and classifying key distribution and feature authentication transactions. The invention does not involve the secure sharing and collaborative analysis of data from multiple institutions, does not support various big data analysis methods, and only involves data storage and reading.

China patents a real-time big-data trading secret protection method based on symmetric encryption, application number 201710666085.0. The invention realizes the protection of trade secrets against real-time data changes and increments, and the data is stored in disorder by the server. When data is needed, the time sequence of the raw data is restored and the data change increment is adjusted to finally obtain the raw data. The invention does not involve the secure sharing and collaborative analysis of data from multiple institutions, does not support various big data analysis methods, and only involves data storage and reading.

SUMMARY OF THE DISCLOSURE

The purpose of this invention is to provide a whole-lifecycle encrypted big data analysis method and system for the data from the different sources, based on the whole-lifecycle encryption secure sharing, trade secret protection and federated learning of big data research analysis, to solve the current problem of the privacy protection in big data multi-party collaborative analysis.

To achieve these aims, the technical proposal is described as following:

On the one hand, this invention provides a whole-lifecycle encrypted big data analysis method for the data from the different sources, including the following steps:

Processing the data from the multiple data sources to obtain the data for each data source involved in the calculation, which is required by the analysis, wherein the raw data of each data source would never cross the border of the local area, and encryption is required for all the uploaded data;

According to the predetermined requirements, performs federated model training of corresponding analysis methods on the data involving in the calculation of the multiple data sources in a trusted execution environment, and obtains model training results after multiple iterations;

Update the global model based on the model training results;

Validate the global model.

Further, the steps of processing the data from multiple data sources to obtain the data involved in calculation of each data source required for analysis comprises:

Process the data from the different data sources to obtain the data with a unified format;

Encrypt the data with the same format according to analysis requirements and transmit them to a secure computing server;

Process the transmitted data in a verified trusted execution environment to form a database of all the processed data, which is a global database: all data from the different data sources involved in the calculation;

The data corresponding to each data source in the global database is transmitted back to the corresponding data source, that is, the data of each corresponding data source involving in the calculation, to form a local feature database of the data source;

Each data source forms the corresponding data required for analysis to participate in the calculation according to the local feature database.

Further, the steps of processing the data from the different data sources to obtain the data with a unified format comprise:

According to the data analysis requirements, the corresponding data model is selected to perform unified processing on the data from the different data sources in each data source locally to generate globally available data structures, model parameters, mapping files, and preprocessed files.

Further the steps of encrypting the data with the same data format based on analysis requirements and transmitting them to the secure computing server comprise:

Perform security detection between each of the data sources and the secure computing server; generate corresponding security reports and security keys, and then encrypting the modeled data in each data source according to the corresponding security keys;

The encrypted data would be transmitted to the secure computing server based on the requirements.

Further, the steps of processing the transmitted data in a verified trusted execution environment to form a database of all the processed data includes: perform data collision checking, and organize data as required to form a database of all the processed data.

Further, the collision check processing adopts at least one of the following: binary search tree, sequential search, binary search, chunking algorithm, red-black tree, balanced search tree, hash table, trie, suffix tree, Bloom Filter, brute-force, Rabin-Karp algorithm, KMP algorithm, Boyer-Moore algorithm, Sunday algorithm, Horspool algorithm, and perform block processing of data in trusted execution environment Further, the database of the total data includes union, intersection, difference or a combination of these different data sources.

Further, the data of each data source in the global database is returned to the corresponding data source to form a local feature database of that data source. In this step, the returned data includes the indexing data or the feature data determined according to specific requirements.

Further, after processing the data of the different data sources, the data of the data source is divided into multiple data sets to reduce the data amount for each data set, and establish an encrypted Oblivious RAM Tree for each data set;

or;

After processing the data of multiple data sources, an encrypted Oblivious RAM Tree is established for the data of the data source.

Further, based on the predetermined requirements, in the step of performing corresponding analytical method and federated learning of the data from the different data sources involved in the calculation in a trusted execution environment, the described analytical methods include logistic regression, decision trees, support vector machines, various neural network algorithms and statistical analysis methods.

Further, based on the predetermined requirements, the steps of federated model training of corresponding analysis methods on the data involving in the calculation of the multiple data sources in a trusted execution environment, and obtains model training results after multiple iterations include:

According to the different data analysis requirements, perform federated modeling on the data of each data source involved in the calculation; then perform federated model training to calculate data characteristics and intermediate parameters. On the data source side, the calculation can be performed in a trusted execution environment. The calculated data characteristics and intermediate parameters are encrypted and uploaded to the secure computing server;

The secure computing server generates global parameters based on data characteristics and intermediate parameters, and returns them to each data source in encrypted form;

Repeat the above two steps until the stop condition is met. The model obtained after the iteration stops is the global model.

Further, the method of verifying the global model includes k-fold cross-validation or leave-one-out cross-validation.

Further, it comprises a log recording step for recording information about the data used.

Further, the information of the data includes data statistics and/or data content; the log recording method includes files, databases, queue and/or blockchain.

Further, the data is optimized according to different analysis algorithm requirements and data characteristics, and the data is optimized in stages or in parallel; including: removing data entry with missing values, missing values imputation, and/or binning features On the other hand, this invention provides a whole-lifecycle encrypted big data analysis system for the data from the different sources, and is used to execute the method described in previous content; the system includes a data source cluster and a secure computing server;

The data source cluster includes the multiple data sources and data joint modeling & encryption modules; the multiple data sources are used to provide data with a unified data format; the data joint modeling & encryption module is used to perform encryption and federated modeling of data provided by the multiple data sources, and locally perform federated model training computation on the data source. Wherein the raw data of each data source would never cross the border of the local area, and encryption is required for all the uploaded data.

The secure computing server is used to analyze and process the data.

Further, the secure computing server includes a data source data processing sub-module, a model training sub-module, and a model validation sub-module;

The data source data processing sub-module processes data from the multiple data sources to obtain the data for each data source involved in the calculation, which is required by the analysis;

According to the predetermined requirements, the model training sub-module performs federated model training of corresponding analysis methods on the data involving in the calculation of the multiple data sources in a trusted execution environment, and obtains model training results after multiple iterations; Then it updates the global model based on the model training results;

The model validation sub-module validates the global model.

Further, the data source data processing sub-module includes an encryption processing unit, a collision checking unit, a data organization unit, and a data return unit;

The encryption processing unit performs encryption processing on data with a unified data format according to analysis requirements;

The collision checking unit performs collision checking on the transmitted data in a verified trusted execution environment to remove redundant data;

The data organization unit reorganizes the data after the collision check to form a database of total data, that is, the data of all data sources involved in the calculation;

The data return unit returns the data corresponding to each data source of the global database to the corresponding data source, that is, the data involved in the calculation of the corresponding data source, to form a local the feature database of the data source.

Further, the data joint modeling & encryption module and the secure computing server comprises a log sub-module respectively, and the log sub-module used to record the information of data used.

Further, the information of the data includes data statistics and/or data content; the log recording method includes files, databases, Queue and/or blockchain.

Further, it comprises an optimization sub-module, which optimizes the data according to different analysis algorithm requirements and data characteristics, in stages or in parallel; including: removing data entry with missing values, missing values imputation, and/or binning features.

To sum up, this invention provides a whole-lifecycle encrypted big data analysis method and system for the data from the different sources. The method performs unified local modeling of the data from the multiple data sources and transmitting them to a secure computing server after encryption. This secure computing server then processes and analyzes the data, including feature extraction, model training and model validation. The system includes the multiple data sources corresponding to the described method and a secure computing server, for providing data, analyzing and processing the data. By processing and encrypting the data locally, and by supporting secure data sharing and federated learning of the multiple data sources, this invention achieves protection of the data sources and addresses the privacy and security issues of the raw data in the cross-institution big data collaborative analysis.

Compared with the existing technology, the beneficial effect of this invention is that: it is based on the federated learning mode, and all storage, modeling computations and encryption involving the raw data are performed in isolation from the data source, and no data is exchanged between the multiple data sources. An untrusted third-party cloud server can only access the modeled and encrypted data, thus fundamentally avoiding data leakage and ensuring the security of the raw data.

DETAILED DESCRIPTION

In order to make the objectives, the technical solutions, and the advantages of the invention clearer, the invention is described in detail below with specific embodiments and reference figures. Note that, these descriptions are only demonstrative examples and not intended to limit the scope of the invention. Besides, in the following description, the introduction of well-known structures and technologies is omitted to avoid unnecessarily obscuring the invention concept.

Figure 1:
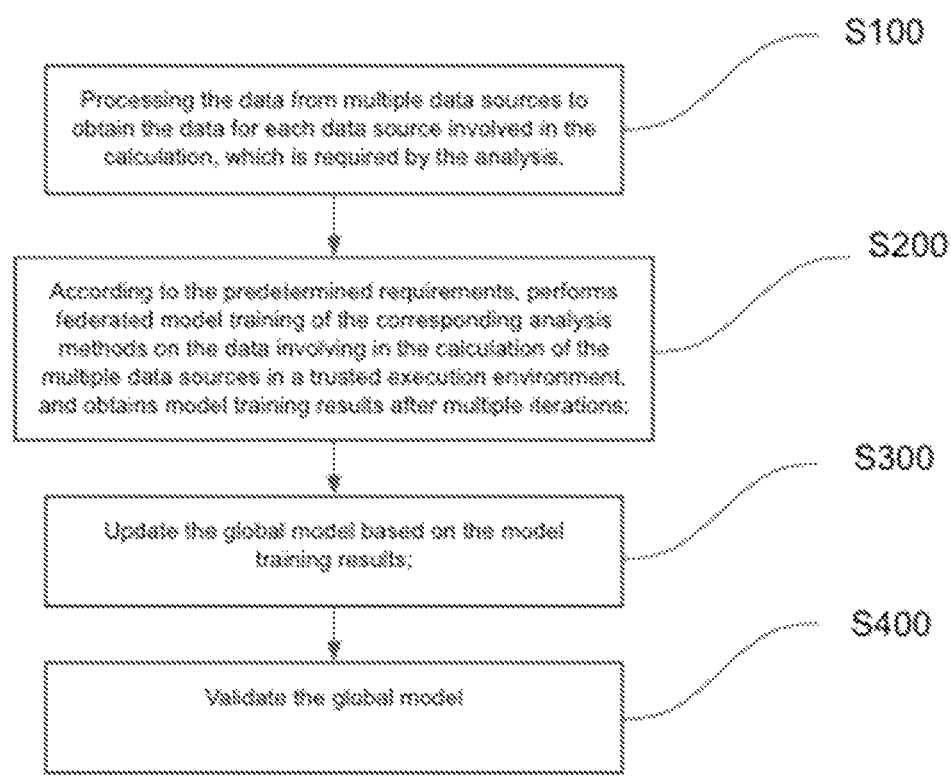
FIG. 1 is a schematic flowchart of a whole-lifecycle encrypted big data analysis method for the data from the different sources according to an embodiment of the invention.

In the first aspect, the invention provides a whole-lifecycle encrypted big data analysis method for the data from the different sources, as shown in FIG. 1, including the following steps:

Step S100: processing the data from the multiple data sources to obtain the data for each data source involved in the calculation, which is required by the analysis, wherein the raw data of each data source would never cross the border of the local area, and encryption is required for all the uploaded data.

Figure 2:
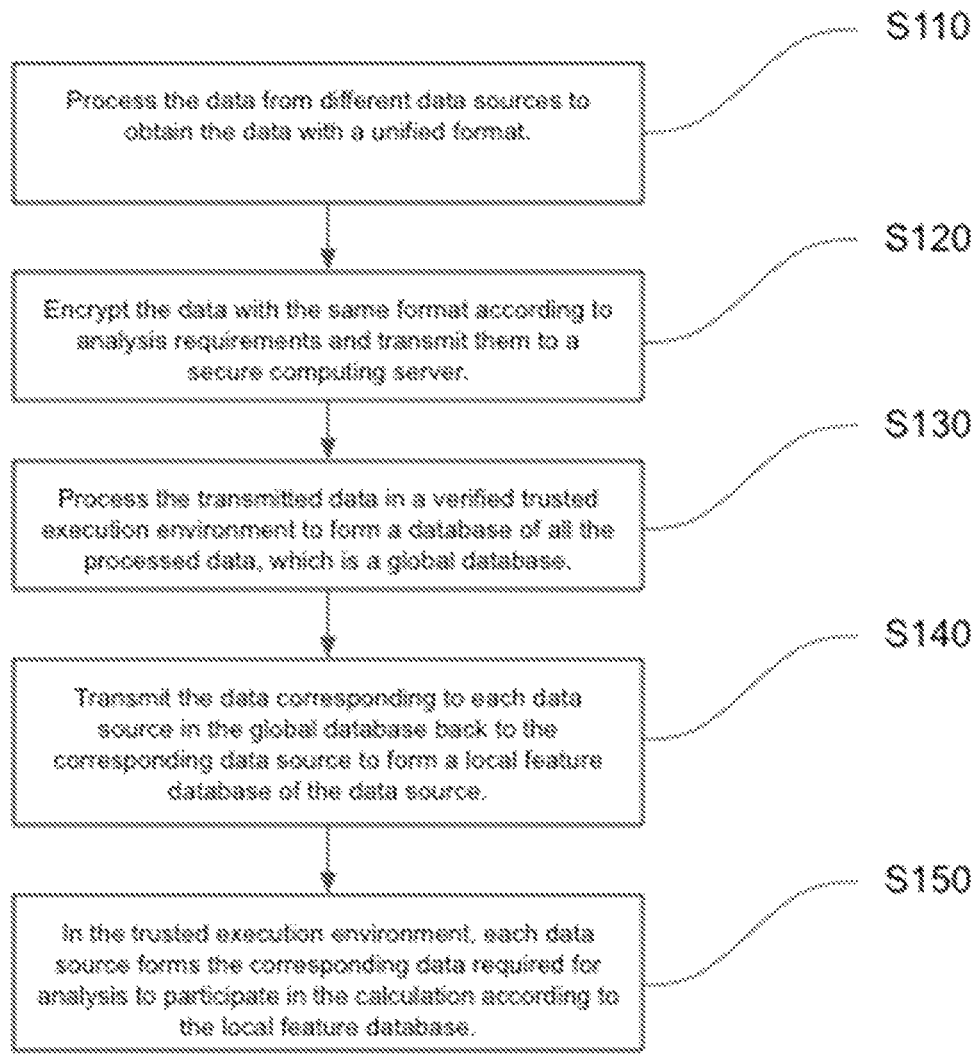
FIG. 2 is a schematic flowchart of step S100 in FIG. 1.
Figure 3:
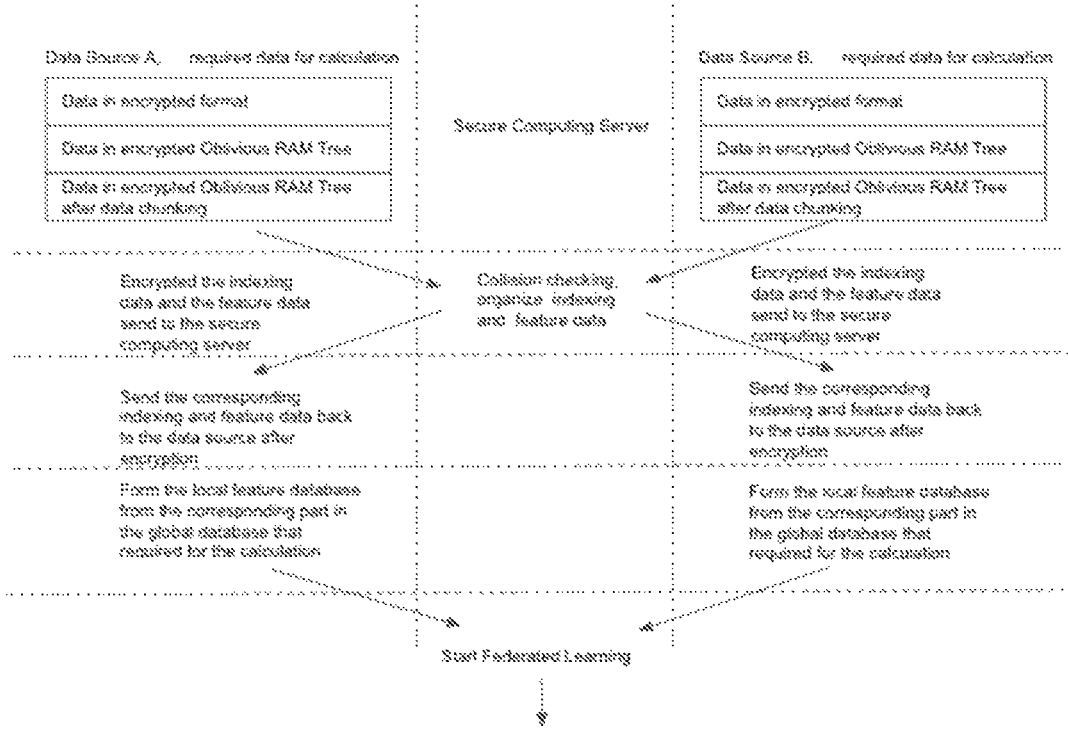
FIG. 3 is a schematic flowchart of a specific implementation of step S100.

Further, the step S100 includes the following steps, as shown in FIG. 2 and FIG. 3:

Step S110, Process the data from the different data sources to obtain the data with a unified format. Specifically, define the expression, essence, structure and/or coding strategy of related data according to data analysis requirements (e.g., for a specific algorithm, a unified structure of the data, parameters, mapping files, and preprocessed files for all data sources). The purpose of this step is to unify the data structure and parameter coding for all data sources, which can achieve data standardization to facilitate collaborative calculation.

Step S120, Encrypt the data with the same format according to analysis requirements and transmit them to a secure computing server. Specifically, perform security inspections on each data source and the secure computing server, generate corresponding security reports and security keys, and perform data encryption (either part of the data or all the data after data modeling) in each data source based on the analysis requirements is using the corresponding security key; encrypted data (or part of the encrypted data depends on the application requirements) is then transmitted to the secure computing server. The encrypted data includes the indexing data, reordering data and/or other data, other data may include identity information fields. For example, before uploading local modeling parameters, reorder the data according to the indexing data, and generate a mapping file at the same time to ensure the correspondence between the reordered data and the original data, then encrypt the reordered data and transmit it to the secure computing server. Encryption processing includes: remote security inspections of data sources and secure computing server (e.g., Intel's remote attestation technology), each data source initiates remote attestation process to the secure computing server to obtain an attestation report (verified certification report) and security key (symmetric key). Each data source uses the corresponding symmetric key to encrypt local modeling data and upload the encrypted data to the secure computing server based on specific analysis requirements to ensure the reliability of the secure computing server. This process achieves the verification of the secure computing environment and the exchange of the data encryption key.

Step S130, process the transmitted data in a verified Trusted Execution Environment (TEE), such as data collision check, to form a database of all the processed data, which is a global database: all data from the different data sources involved in the calculation. For example, decrypt the reordered data in the trusted execution environment, and perform a data collision check algorithm based on the indexing data to remove redundant data. The remaining data is the data union of different data sources that form the global database. Also, the global database could be the data intersection or the difference, or the combination. Because the memory of TEE is relatively small, in order to improve the calculation efficiency of data collision check for big data, the present invention can adopt at least one of the following algorithm: binary search tree, sequential search, binary search, chunking algorithm, red-black tree, balanced search tree, hash table, trie, suffix tree, Bloom Filter, brute-force, Rabin-Karp algorithm, KMP algorithm, Boyer-Moore algorithm, Sunday algorithm, Horspool algorithm and other algorithms to perform chunk processing under trusted computing environment. In the meantime, the number of data collisions is recorded in the system (i.e., the amount of repeating data is recorded using block chain, database or file system).

Step S140, the data corresponding to each data source in the global database is transmitted back to the corresponding data source, that is, the data of each corresponding data source involving in the calculation, to form a local feature database of the data source; The returned data includes the indexing data or the feature data determined according to specific requirements. Further, the returned data is encrypted before transmission. For example, perform remote security inspection on the data source, obtain a security report (verified certification report) and a security key (symmetric key), then use the security key to encrypt and transmit the returned data.

Step S150, each data source forms corresponding data required for the analysis to participate in the calculation according to the local feature database. This step can be executed in a trusted execution environment or not in a trusted execution environment.

Further, after obtaining data with a unified data format, the data of each data source is divided into multiple small data sets to reduce the amount of data in each data set, and an encrypted Oblivious RAM Tree is established for each data set. Divide the data set into small data sets (down from the TB level to the GB level), and build Oblivious RAM Tree respectively. This method will reveal the access frequency of GB-level data. The invention uses Oblivious RAM Tree to ensure that it is difficult for an attacker (having the right to observe the storage area) to obtain information during the data access phase. However, on the other hand, when an Oblivious RAM Tree is too large, the access efficiency of the trusted execution environment decreases significantly. Therefore, the invention adopts the above-mentioned method of dividing the data set of the total data into multiple small data sets, and establishing an encrypted Oblivious RAM Tree for each small data set to improve its efficiency.

Or, after obtaining data with a unified data format, an Oblivious RAM Tree is established for the data of the data source.

Specifically, the data is fetched in random order within the trusted execution environment; then it is re-encrypted and stored in order. For example, an encrypted Oblivious RAM Tree is established for the entire data set, and the data is fetched in random order (i.e., traversing the entire data set) within a trusted execution environment (TEE, such as Intel's SGX). Then the data is re-encrypted and stored to the hard disk in order. The time complexity of data access is O (1) and no additional storage overhead. Although this process introduces the leakage of access frequency, it is difficult to map the leaked frequency with specific data. This process can also improve the algorithm efficiency. Further, one-time preprocessing based on an encrypted Oblivious RAM Tree can be used to improve the efficiency of data extraction.

Step S200, in accordance with the predetermined requirements, i.e., specific analysis methods, according to the federated collaborative computing specifications, with the data corresponding to each data source in the global database, federated model training of specific analysis method is performed in the trusted computing environment. The analysis methods include logistic regression, decision trees, support vector machines, various neural network algorithms, and data statistical analysis methods. Specifically, the local calculation of each data source in the federated learning process may or may not be performed in the local trusted execution environment. During the federated learning process, the encrypted intermediate data is transmitted from the local data source to the trusted execution environment in the secure computing server, and it is processed in the trusted execution environment of the secure computing server, the model training result is finally obtained after a number of iterations.

Further, the step S200 includes:

Step S210, in the trusted execution environment, each data source computes data features and intermediate parameters using the data obtained through S150, such as the local average values of each data source, and the local logistic regression training parameter, etc., which are later encrypted and uploaded to the secure computing server.

Step S220, the secure computing server, based on the data features and the intermediate parameters, generates global parameters such as global average matrix, and/or global logistic regression training parameter, then (in encrypted form) transmitted it back to the trusted execution environment of each data source;

Repeat the above two steps S210-S220, until a stop condition is satisfied, the model obtained after the iteration stops is the global model.

Take the principal component analysis algorithm as an example. This algorithm is used to perform the population stratification on the raw genotype data to obtain the data with the highest principal component (for example, some specific genotype does not apply for all the regions or all the races, thus can be excluded in advance). Secure computing server initializes the principal component coefficients (step S600); each data source computes the local covariance matrix in its trusted execution environment, then uploads the encrypted local covariance matrix to the secure computing server (step S610); the secure computing server calculates the global covariance matrix and corresponding intermediate parameters based on the uploaded local covariance matrices of all the data sources (step S620), then transmits the global intermediate parameters back to the trusted computing environment of each data source in an encrypted form.

Step S300, secure computing server updates the global model based on the model training results.

Step S400, model validation is performed on the global model, the analysis requirements are satisfied if the validation is passed. Specifically, the model validation includes but not limited to k-fold cross-validation, leave-one-out cross-validation (LOOCV) and the like.

Further, it also includes a logging process, which is used to record information about the data used. The recorded information of the data includes data statistics (for example, the size or the frequency of the data) and/or data content; the log method includes file system, databases, queues, and/or blockchains.

Further, based on different algorithm requirements and data features, according to the feature description and/or the statistical distribution, the data can be optimized stage by stage or in parallel; for example, the first stage: removing data entry with missing values; the second stage: missing value imputation (for example, using the mean value of the feature). And features binning (discretization of continuous data, such as age stratification, etc.).

Relying on the system architecture and data processing procedures provided by the invention, authorized users can develop a wide range of whole-lifecycle encrypted big data analysis methods in compliance with various business secret protection regulations, including but not limited to: (1) ID Matching: Fast index matching of labeled data across the multiple data sources; (2) Data Query: Double-blind data query, i.e., the data queryer cannot know the content of the database, while the data provider cannot know the specific queried information of the data queryer. (3) Data Analysis: Including various big data analysis statistical methods (for example, analysis of variance, Kolmokolov-Smilov test, and genome-wide association analysis, etc.).

Figure 4:
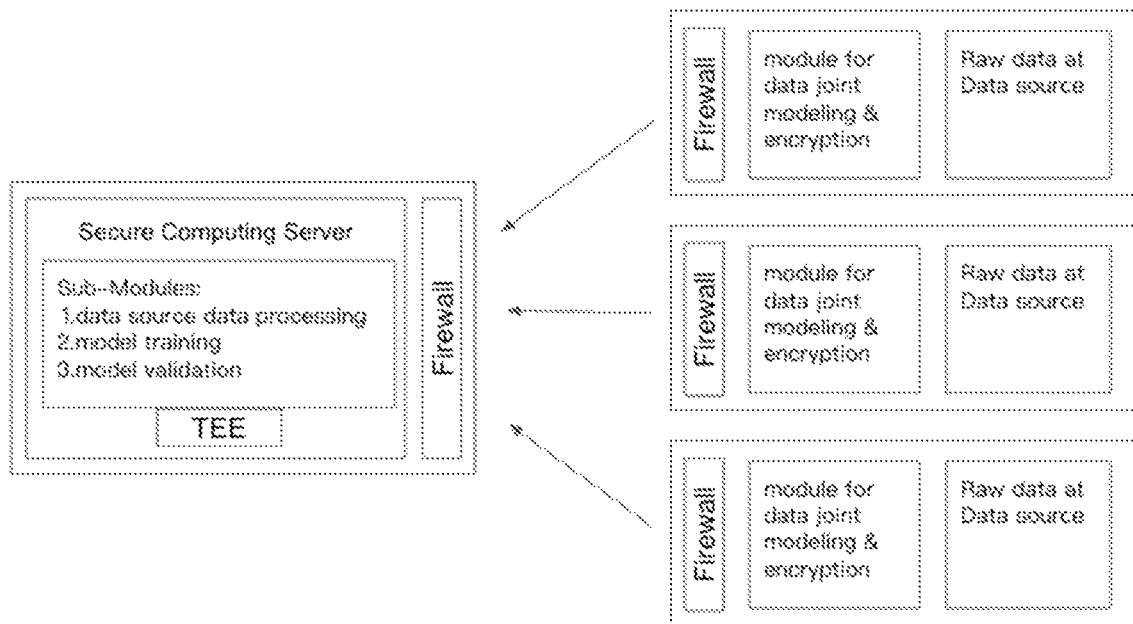
FIG. 4 is a schematic diagram of the structure of the whole-lifecycle encrypted big data analysis system for the data from the different sources according to an embodiment of the present invention.

In the second aspect, the invention provides a whole-lifecycle encrypted big data analysis system for the data from the different sources, as shown in FIG. 4, for executing the analysis method as described above; the system includes a data source cluster (data source 1-N) and a secure computing server. Specifically, the data source cluster includes the multiple data sources while each data source has a big data joint modeling & encryption module; each data source is an independent entity. the multiple data sources are used to provide data with a unified data format, each data source holds its own big data and agrees to participate in the federated learning of the entire network (that is, all data sources) based on the full-process encryption big data analysis system with business secret protection technology. Big data joint modeling & encryption module in each data source is used to provide data encryption, federated modeling and local federated model training, all the data sources collaboratively perform unified modeling. The secure computing server is used to analyze and process the above-mentioned data.

There is a reliable encrypted communication channel between the data source and the secure computing server. The secure computing server can be deployed on one of the data sources or on a third party.

Further, the big data federated modeling and encryption module performs data encryption and federated modeling using the data with unified format; this module is also responsible for federated model training within each data source. Wherein the raw data of each data source would never cross the border of the local area, and encryption is required for all the uploaded data. Before uploading the intermediate calculation parameters of local modeling, the data source and the secure computing server perform security inspections (for example, the remote attestation technology based on Intel SGX), and obtain a security report and a security key (data encryption) to ensure the reliability of the secure computing server and the reliability of communication channel.

Further, the secure computing server is responsible for big data processing and analyzing in a trusted execution environment. In a preferred embodiment, its core program uses and deploys a Trusted Execution Environment (TEE). Specific solutions include but are not limited to Intel SGX software protection extension, AMD's PSP (Platform Security Processor) processor, ARM TrustZone technology, etc., all operations are performed in the trusted execution environment, which significantly improves the security guarantees of the system and achieves the privacy, integrity and availability of the program code and data. Specifically, the core program only trusts itself and the trusted execution environment, which effectively prevents the underlying OS (operating system) from being hijacked to attack the core program. At the same time, from the management aspect, it is unnecessary to trust the cloud service provider of the secure computing server.

Specifically, the secure computing server includes a data source data processing sub-module, a model training sub-module, and a model validation sub-module;

The data source data processing sub-module processes data from the multiple data sources to obtain the data for each data source involved in the calculation, which is required by the analysis.

According to the predetermined requirements, the model training sub-module performs federated model training of corresponding analysis methods on the data involving in the calculation of the multiple data sources in a trusted execution environment, and obtains model training results after multiple iterations; Then it updates the global model based on the model training results;

The model validation sub-module validates the global model.

Further, the data source data processing sub-module includes an encryption processing unit, a collision checking unit, a data organization unit, and a data return unit;

The encryption processing unit performs encryption on the unified modeling data according to analysis requirements;

The collision checking unit performs collision checking on the transmitted data in a verified trusted execution environment to remove redundant data;

The data organization unit reorganizes the data after collision checking to form a database of all the processed data; the database of all the processed data includes intersections between data sources, unions between data sources, and differences between data sources or a combination thereof;

The data return unit returns the data corresponding to each data source in the global database to the corresponding data source to form a local feature database of the data source.

Further, the charging mode of the invention can be based on full authorization, traffic charging, mixed mode and so on. Each module of the invention achieves the log function in compliance with the privacy protocol (only records data flow statistics, non-sensitive data, encrypted data, etc.), and performs corresponding charging judgment and audit work by recording the traffic of the computation data flow.

The data joint modeling & encryption module, and the secure computation server each including a log sub-module, which is used to record the information of the data used. The specific recording content is determined by business requirements. Only the statistical values of the data used can be recorded, such as the number of data records, the size of the data, the access frequency of the data, etc., or specific data content used (if privacy issues are involved, only the encrypted version can be recorded, the audit or the billing party cannot know its specific content). The log format can be determined according to business requirements, and it can be logged in file systems, databases, queues and/or blockchains. The recorded content can be used for billing and auditing.

Further, it also comprises an optimization sub-module, which optimizes the data according to different analysis algorithm requirements and data characteristics, in stages or in parallel; including: removing data entry with missing values, missing values imputation, and/or binning features. (discretization of continuous data, such as age stratification, etc.).

The invention is further illustrated by the following embodiments.

Embodiment 1

Genome-Wide Association Analysis (GWAS).

GWAS aims to study and analyze the single nucleotide polymorphisms (SNPs) most related to a specific disease. A single research institution, that is, a genetic data institution, often has insufficient data, while data sharing among multiple research institutions often involves privacy concerns of genetic data.

By using the system and methods provided by the invention, the cross-institution privacy-preserving federated analysis via encrypted communication channels can be carried out successfully.

Step 1: each genetic data institution, that is, the research institution, performs data preprocessing according to the unified data model (removal of irrelevant genetic data, unified coding, etc.), and then performs security checks with the secure computing server, generates encryption keys and deploys gene calculation rules in the secure computing server.

Step 2: each genetic data institution encrypts the data that it participates in the calculation.

Step 3: each genetic data institution uploads part or all of the encrypted data to the secure computing server in a secure manner according to the research requirements.

Step 4: the secure computing server performs collision checking (if necessary) according to the requirements of the analysis method, or performs other matchings after natural language processing.

Step 5: form the global data set required based on the analysis requirements and the calculation results of the fourth step, for example, data set intersection or union among all the genetic data institutions.

Step 6: the secure computing server returns the index of the corresponding part of the data set to each genetic data institution.

Step 7: each genetic data institution receives the returned indexing data to construct a complete feature database for the analysis.

Step 8: each genetic data institution and the secure computing server perform a federated principal component analysis (PCA) algorithm (multiple interactive interactions, and the statistical values exchanged in this process are encrypted with a key) to select the global principal component data. Then, each data institution and the secure computing server perform a federated generalized linear regression algorithm (multiple interactive interactions, and the data is encrypted with a key), and finally calculate the most relevant SNPs for this specific disease.

Embodiment 2

Financial credit investigation (personal credit history query by third party, both the local data source and the secure computing server have a TEE).

2.1 Financial Credit Investigation and Credit Granting—Model Training

Various financial credit institutions or data source institutions hold different credit-related personal data (age, gender, income, occupation, etc.), each of them uses a different model to perform model training, generating independent personal credit scores. On the one hand, due to the limitations of data type and size, the credit scores generated by each financial credit institute or each data source institute cannot reflect the real personal credit history comprehensively. On the other hand, a simple weighted sum of the credit scores of all the financial credit institutions and the data source institutions cannot fully utilize all the data effectively, which leads to inaccurate results.

By using the system and methods provided by the invention, the cross-institution privacy-preserving model training for financial credit investigation and credit granting can be carried out successfully.

Step 1: credit algorithm deployment, each financial credit institute or data source institute performs data preprocessing (i.e., feature engineering, such as missing values imputation, dummy coding, and feature binning, etc.) based on a unified data model. The third-party inquiry agency and the secure computing server perform security inspections, generate encryption keys, and the secure computing server deploys relevant credit calculation rules.

Step 2: each financial credit institute or data source institute downloads the encrypted global training model and stores it in the local secure execution environment, then performs local secure calculation by importing the preprocessed data into the global model.

Step 3: each financial credit institute or data source institute transmits the encrypted intermediate calculation result to the secure computing server in a secure manner.

Step 4: the secure computing server updates the global training model according to analysis calculation rules.

Step 5: repeating the third and fourth step, the financial credit institutions or the data source institutions together with the secure computing server perform federated learning, until the training model converges or reaches the specified number of iterations.

Step 6: the secure computing server encrypts the obtained final global training model or sends it to a third-party inquiry agency.

2.2 Financial Credit Investigation and Credit Granting—Credit Inquiry

Based on global financial credit model training of embodiment 2.1, the third party performs personal credit inquiry. Various financial credit institutions or data source institutions hold different credit-related personal data (age, gender, income, occupation, etc.), based on the business needs (for example, applying for credit cards), the third-party agency needs to obtain the personal credit score. On the one hand, it is necessary to protect the third-party query information from being known by the credit reporting agencies, and on the other hand, it is necessary to ensure that the global training model parameters are not disclosed.

By using the system and methods provided by the invention, the two-way privacy-preserving personal credit score inquire can be carried out successfully.

Step 1: each financial credit institute or data source institute performs data preprocessing (excluding irrelevant data, unified data modeling, data coding, etc.), then performs security inspection with the secure computing server, generates encryption keys, and the secure computing server deploys relevant calculation rules.

Step 2: based on the analysis requirements, each financial credit institute or data source institute encrypts the data required by the calculation (e.g., feature category, ID coding, etc.), and the third-party inquiry institute encrypts the query request information.

Step 3: based on the analysis requirements, each financial credit institute or data source institute transmits the encrypted data and the third-party inquiry agency transmits the encrypted query request information to the secure computing server in a safe manner.

Step 4: based on the predefined credit calculation algorithm, the secure computing server performs ID matching (collision checking), and allocates different parameters to different secure execution environments of the financial credit institutions or the data source institutions based on the global training model obtained in embodiment 2.1 and the data feature categories uploaded.

Step 5: based on the allocated parameters and the ID matching results, each financial credit institute or data source institute performs model calculation in their local trusted execution environment, then the encrypted calculation results are sent back to the secure computing server.

Step 6: secure computing server sums up the local calculation results to generate a global personal credit score.

Step 7: the final result is returned to the third-party inquiry agency in a secure encryption manner.

Embodiment 3

Secure Modeling and Evaluation of Insurance Data.

Various hospitals, insurance companies, and third-party data sources hold different client data. Insurance companies want to use multiple data sources for building a more accurate model for insurance claims and for evaluating the risk of their clients. However, due to data privacy concerns, data ownership issues, and legal restrictions, various data source companies cannot and do not want to share data directly.

By using the system and methods provided by the invention, the cross-institution privacy-preserving insurance data secure modeling and evaluation can be carried out successfully. Firstly, each data source preprocesses the data (ID encoding, ID reordering, data encryption, generating mapping files, etc.). Secondly, each data source and the secure computing server perform security inspections to generate encryption keys. Thirdly, each data source performs local calculations through federated learning, uploads the encrypted intermediate statistical values to the secure computing server. And the secure computing server performs data secure calculations in the trusted execution environment, generates the global model, finally encrypts the calculation results and sends it to the insurance company.

Step 1: Deployment of data modeling and evaluation algorithms. All hospitals, insurance companies and third-party data sources perform data preprocessing according to the unified data model (e.g., ID encoding, ID reordering, data encryption, generating mapping files, etc.), and perform security inspections with the secure computing server, generates encryption keys, establishes a secure communication channel, and the secure computing server deploys related insurance data modeling and evaluation algorithms.

Step 2: each hospital, insurance company, and third-party data sources encrypt the data required by the calculation, and the third-party query agency encrypts the query requested information.

Step 3: each hospital, insurance company, and third-party data sources upload part or all of the encrypted data to the secure computing server in a secure manner according to the analysis requirements.

Step 4: based on the pre-defined data modeling and evaluation algorithm, the secure computing server performs collision checking or performs other matching methods according to the algorithm requirements, such as natural language processing.

Step 5: form a database of all the processed data based on the calculation rules and the results obtained from Step 4, such as the complete set or the intersection among various hospitals, insurance companies, and third-party data sources.

Step 6: the secure computing server sends the index of the complete set back to each data source institution, that is, various hospitals, insurance companies, and third-party data sources.

Step 7: each data source institution, that is, various hospitals, insurance companies, and third-party data sources, receives the returned indexing data to construct a complete feature database for the analysis.

Step 8: Each hospital, insurance company, and third-party data source and the secure computing servers perform a federated principal component analysis algorithm (multiple interactive iterations, while the data is encrypted with a key) to obtain the global principal component data. Then, each data source institute and the secure computing server perform a federated generalized linear regression algorithm (multiple interactive iterations, while the data is encrypted with a key), and finally calculate and the final result and obtain the calculation model.

Step 9: deploy the model for model evaluation.

The invention is based on federated learning, includes a secure computing server, and multiple data source institutions. All operations of the raw data (e.g., storage, encryption, and calculations, etc.) are performed in the isolated environment at the data source institute, which avoid data privacy leakage from the root cause (no data exchange among data sources, and the untrusted third-party cloud service providers can only access the encrypted data).

To sum up, the invention provides a whole-lifecycle encrypted big data analysis method and system for the data from the different sources. The method performs unified local modeling of data from multiple data sources and transmitting them to a secure computing server after encryption. This secure computing server then processes and analyzes the data, including feature extraction, model training and model validation. The system includes multiple data sources corresponding to the described method and a secure computing server, for providing data, analyzing and processing the data. By processing and encrypting the data locally, and by supporting secure data sharing and federated learning of multiple data sources, this invention achieves protection of the data sources and addresses the privacy and security issues of the raw data for cross-institution big data collaborative analysis.

It should be understood that the above-mentioned specific embodiments of the invention are only used to exemplarily illustrate or explain the principle of the invention, and do not constitute a limitation to the invention. Therefore, any modifications, equivalent substitutions, improvements, etc. made without departing from the principle and scope of the invention should be included in the protection scope of the invention. In addition, the appended claims of the invention are intended to cover all changes and modifications that fall within the scope and boundary of the appended claims, or equivalent forms of such scope and boundary.

The invention claimed is:

1. A whole-lifecycle encrypted big data analysis method for the data from different data sources, which is characterized by the following steps:

processing the data from multiple data sources to obtain the data for each data source involved in the calculation, which is required by the analysis, comprising:

process the data from the different data sources to obtain the data with a unified format; encrypt the data with same format according to analysis requirements; perform security detection between each of the data sources and the secure computing server; generate corresponding security reports and security keys, and then encrypting the modeled data in each data source according to the corresponding security keys; transmit the encrypted data to the secure computing server based on the requirements; wherein raw datas of each data source would never cross a border of local areas;

according to predetermined requirements, performs federated model training of corresponding analysis method on the data involving in a calculation of the multiple data sources in a trusted execution environment, and obtains model training results after multiple iterations;

update a global model according to the model training result;

validate the global model.

2. According to the whole-lifecycle encrypted big data analysis method for the data from the different sources described in claim 1, wherein the steps of processing the data from multiple data sources to obtain the data for each data source involved in the calculation, which is required by the analysis, also comprises:
process the transmitted data in a verified trusted execution environment to form a database of all the processed data, which is a global database: all of the data from the different data sources are involved in the calculation;
the data corresponding to each data source in the global database is transmitted back to the corresponding data source, that is, the data of each corresponding data source involving in the calculation, to form a local feature database of the data source;
in the trusted execution environment, each data source forms the corresponding data required for analysis to participate in the calculation according to the local feature database.

3. According to the whole-lifecycle encrypted big data analysis method for the data from the different sources described in claim 2, wherein the steps of processing the data from the different data sources to obtain the data with a unified format comprises:
according to data analysis requirements, a corresponding data model is selected to perform unified processing on the data from the different data sources in each data source locally to generate globally available data structures, model parameters, mapping files, and preprocessed files.

4. According to the whole-lifecycle encrypted big data analysis method for the data from the different sources described in claim 2, wherein the steps of processing the transmitted data in a verified trusted execution environment to form a database of total data: the data is processed for collision checking, and the data is organized as needed to form a database of the total data.

5. According to the whole-lifecycle encrypted big data analysis method for the data from the different sources described in claim 4, wherein the collision check processing adopts at least one of the following: binary search tree, sequential search, binary search, chunking algorithm, red-black tree, balanced search tree, hash table, trie, suffix tree, Bloom Filter, brute-force, Rabin-Karp algorithm, KMP algorithm, Boyer-Moore algorithm, Sunday algorithm, Horspool algorithm, and perform block processing of data in trusted execution environment.

6. According to the whole-lifecycle encrypted big data analysis method for the data from the different sources described in claim 4, wherein the database of total data includes union, intersection, difference or a combination of these for different data sources.

7. According to the whole-lifecycle encrypted big data analysis method for the data from the different sources described in claim 2, in the step of transmitting back the data corresponding to each data source in the global database to the corresponding data source to form a local feature database, the transmitted data includes the indexing data or the feature data determined according to specific requirements;
the data corresponding to each data source in the global database is transmitted back to the corresponding data source.

8. According to the whole-lifecycle encrypted big data analysis method for the data from the different sources described in claim 2, wherein after processing the data of the different data sources, the data of the data source is divided into multiple data sets to reduce the data amount for each data set, and establish an encrypted Oblivious RAM Tree for each data set;
or;
after processing the data of multiple data sources, an encrypted Oblivious RAM Tree is established for the data of the data source.

9. According to the whole-lifecycle encrypted big data analysis method for the data from the different sources described in claim 1, where in the step of performing corresponding analytical method and federated learning of the data from the different data sources involved in the calculation in a trusted execution environment based on the predetermined requirements, the described analytical methods include logistic regression, decision trees, support vector machines, various neural network algorithms and statistical analysis methods.

10. According to the whole-lifecycle encrypted big data analysis method for the data from the different sources described in claim 1 or 9, the steps of federated model training of corresponding analysis methods on the data involving in the calculation of the multiple data sources in a trusted execution environment, and obtains model training results after multiple iterations include:
according to different data analysis requirements, perform federated modeling on the data of each data source involved in the calculation; then perform federated model training to calculate data characteristics and intermediate parameters, On the data source side, the calculation can be performed in a trusted execution environment, The calculated data characteristics and intermediate parameters are encrypted and uploaded to the secure computing server;
the secure computing server generates global parameters based on data characteristics and intermediate parameters, and returns them to each data source in encrypted form;
repeat the above two steps until the stop condition is met, the model obtained after the iteration stops is the global model.

11. According to the whole-lifecycle encrypted big data analysis method for the data from the different sources described in claim 1, wherein the method of verifying the global model includes k-fold cross-validation or leave-one-out cross-validation.

12. According to the whole-lifecycle encrypted big data analysis methods for the data from the different sources described in claim 1, where it comprises a log recording step for recording information about the data used.

13. According to the whole-lifecycle encrypted big data analysis method for the data from the different sources described in claim 12, wherein the information of the data includes data statistics and/or data content; the log recording method includes files, databases, queue and/or blockchain.

14. According to the whole-lifecycle encrypted big data analysis method for the data from the different sources described in claim 12, wherein the data is optimized according to different analysis algorithm requirements and data characteristics, and the data is optimized in stages or in parallel; including: removing data entry with missing values, missing values imputation, and/or binning features.

15. A whole-lifecycle encrypted big data analysis system for the data from the different sources, is used to execute the method described in claim 1; the system includes a data source cluster and a secure computing server;
the data source cluster includes multiple data sources and modules for data joint modeling & encryption; the multiple data sources are used to provide data with a unified data format; the data joint modeling & encryption module is used to perform encryption and federated modeling of data provided by multiple data sources, and locally perform federated model training computation on the data source, the raw data of each data source would never cross the border of local area, and encryption is required for all the uploaded data;

the secure computing server is used to analyze and process the data.

16. According to the whole-lifecycle encrypted big data analysis system for the data from the different sources described in claim 15, wherein the secure computing server includes a data source data processing sub-module, a model training sub-module, and a model validation sub-module;

the data source data processing sub-module processes data from multiple data sources to obtain the data involved in the calculation of each data source required for analysis;

according to the predetermined requirements, the model training sub-module performs federated model training of corresponding analysis methods on the data involving in the calculation of the multiple data sources in the trusted execution environment, and obtains model training results after multiple iterations; Then it updates the global model based on the model training results;

the model validation sub-module validates the global model.

17. According to the whole-lifecycle encrypted big data analysis system for the data from the different sources described in claim 16, wherein the data processing sub-module of the data source includes an encryption processing unit, a collision checking unit, a data organization unit, and a data return unit;

the encryption processing unit performs encryption processing on data with a unified data format according to analysis requirements;

the collision checking unit performs collision checking on the transmitted data in a verified trusted execution environment to remove redundant data;

the data organization unit reorganizes the data after the collision check to form a database of total data, that is, the data of all data sources involved in the calculation;

the data return unit returns the data corresponding to each data source of the global database to the corresponding data source, that is, the data involved in the calculation of the corresponding data source, to form a local feature database of the data source.

18. According to the whole-lifecycle encrypted big data analysis methods for the data from the different sources described in claim 15, wherein the federated modeling, encryption module and the secure computing server comprises a log sub-module respectively, and the log sub-module used to record the information of data used.

19. According to the whole-lifecycle encrypted big data analysis methods for the data from the different sources described in claim 18, wherein the information of the data includes data statistics and/or data content; the log recording method includes files, databases, Queue and/or blockchain.

20. According to the whole-lifecycle encrypted big data analysis method for the data from the different sources described in claim 15, it comprises an optimization sub-module, which optimizes the data according to different analysis algorithm requirements and data characteristics, in stages or in parallel; including: removing data entry with missing values, missing values imputation, and/or binning features.

* * * * *